(12) United States Patent
Kourtis et al.

(10) Patent No.: US 10,733,114 B2
(45) Date of Patent: Aug. 4, 2020

(54) DATA CACHE PERFORMANCE

(71) Applicant: International Business Machines Corporation, Armonk, NY (US)

(72) Inventors: Antonios Kornilios Kourtis, Zurich (CH); Nikolas Ioannou, Zurich (CH); Ioannis Koltsidas, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/115,511

(22) Filed: Aug. 28, 2018

(65) Prior Publication Data

US 2020/0073823 A1 Mar. 5, 2020

(51) Int. Cl.
*G06F 12/12* (2016.01)
*G06F 12/02* (2006.01)

(52) U.S. Cl.
CPC .......... *G06F 12/12* (2013.01); *G06F 12/0253* (2013.01); *G06F 2212/1044* (2013.01)

(58) Field of Classification Search
CPC ............... G06F 12/0246; G06F 12/121; G06F 2212/7205; G06F 12/127; G06F 3/0614; G06F 12/12; G06F 12/0253; G06F 2212/1044
See application file for complete search history.

(56) References Cited

U.S. PATENT DOCUMENTS

| | | | |
|---|---|---|---|
| 9,588,891 B2 | 3/2017 | Atkisson et al. | |
| 9,678,874 B2 | 6/2017 | Nellans et al. | |
| 9,720,835 B1 | 8/2017 | Shilane et al. | |
| 9,767,032 B2 | 9/2017 | Talagala et al. | |
| 9,846,651 B2 | 12/2017 | Choi et al. | |
| 2011/0004722 A1* | 1/2011 | Jeddeloh | G06F 12/00 711/103 |
| 2013/0185488 A1* | 7/2013 | Talagala | G06F 12/0246 711/103 |
| 2018/0373428 A1* | 12/2018 | Kan | G06F 3/0679 |
| 2019/0272098 A1* | 9/2019 | Muchherla | G06F 12/0246 |

OTHER PUBLICATIONS

Stephen M. Rumble et al., Log-Structured Memory for Dram-Based Storage, Proceedings of the 12th USENIX Conference on File and Storage Technologies (FAST '14), Feb. 17-20, 2014, 16 pages.

\* cited by examiner

*Primary Examiner* — Zhou H Li
(74) *Attorney, Agent, or Firm* — Daniel P. Morris, Esq.; Hoffmann & Baron, LLP (57) ABSTRACT

Performance of a data cache is controlled; the cache implements a garbage collection process for maintaining free storage blocks in a data store of the cache and an eviction policy for selecting data to be evicted from the cache. A cache performance control method defines a performance target for operation of the cache and, in operation of the cache, monitors performance of the cache in relation to the performance target. The garbage collection process is selectively performed in a relocation mode and an eviction mode so as to promote compliance with the performance target. In the relocation mode, data contained in a set of storage blocks selected for garbage collection is relocated in the data store. In the eviction mode, a set of storage blocks for garbage collection is selected in dependence on the eviction policy and data contained in each selected storage block is evicted from the cache.

17 Claims, 4 Drawing Sheets

| RAW Storage IOps | Target Cache IOps | I/O Amplification Target | WA Target (Worst case = 100% writes) | WA Target (cache read hit ratio 80%) |
|---|---|---|---|---|
| 1000000 | 500000 | 2.00 | 1.50 | 3.50 |
| 1000000 | 700000 | 1.43 | 1.21 | 2.07 |
| 1000000 | 800000 | 1.25 | 1.13 | 1.63 |
| 1000000 | 900000 | 1.11 | 1.06 | 1.28 |
| 1000000 | 1000000 | 1.00 | 1.00 | 1.00 |

DATA CACHE PERFORMANCE

BACKGROUND

The present invention relates generally to data cache performance, and more particularly to controlling performance of a data cache in dependence on a performance target. Cache control methods are provided, together with apparatus and computer program products implementing such methods.

A data cache is a component used to store copies of data objects which are also stored in some form of main data storage so that future requests for data can be served faster. The data store of the cache typically uses a faster storage medium (in terms of access latency, throughput, or both) than the main data store. For example, if the main data store is a hard disk drive, the cache may use DRAM (dynamic random-access memory) or non-volatile memory such as NAND flash, 3DXP (3D cross point) or PCM (phase change memory) as its storage medium. A cache may also be located closer than the main data store (in terms of access latency) to the point at which data requests are made in a data processing system, and usually has less-stringent fault tolerance and data redundancy requirements than the main data store.

Data caches can be implemented via hardware or software in a wide range of system architectures, e.g. as CPU (central processing unit) or DSP (digital signal processor) caches, disk caches, web caches, and caches in tiered storage or distributed processing systems such as data centres or multi-server networks. The operating principles are much the same however. An index, or "directory", is maintained for all cached data objects. The cache directory contains unique identifiers for data objects and address data indicating (logical or physical) addresses for objects in the cache's data store. A cache hit occurs when requested data is found and serviced from the cache, and a cache miss occurs when the requested data is not found in the cache and has to be serviced from the main data store. A cache is typically populated in response to a cache miss (as well as other events in some cases). When a cache contains insufficient space for new data, then previously-cached data is selected for eviction to make room for new data. The data to be evicted is chosen based on a cache eviction policy (also termed "cache replacement policy"), e.g. a least-recently-used (LRU) policy.

Management of storage space in a storage medium of the cache (including capacity utilization bookkeeping, space allocation, reclamation, etc.) is performed by a storage allocator of the cache. Some storage allocators only allow data to be allocated (and updated) out-of-place on the storage medium. For example, a log-structured storage allocator manages the storage medium as a sequentially-written log, whereby new or updated data written to the cache is allocated sequentially to free storage locations. Such allocators offer efficient (tuneable) capacity utilization but require a clean-up process known as "garbage collection". The garbage collection process selects blocks of storage locations, which typically contain both valid (current) and invalid (deleted or updated) data, in the data store, and relocates the valid data to new storage locations. This frees the storage blocks for future data allocation.

SUMMARY

According to at least one embodiment of the present invention there is provided a method for controlling performance of a data cache which implements a garbage collection process for maintaining free storage blocks in a data store of the cache and an eviction policy for selecting data to be evicted from the cache. The method defines a performance target for operation of the cache and, in operation of the cache, monitors performance of the cache in relation to the performance target. The method includes selectively performing the garbage collection process in a relocation mode and an eviction mode so as to promote compliance with the performance target. In the relocation mode, data contained in a set of storage blocks selected for garbage collection is relocated in the data store. In the eviction mode, a set of storage blocks for garbage collection is selected in dependence on the eviction policy and data contained in each selected storage block is evicted from the cache.

At least one further embodiment of the invention provides a computer program product for controlling performance of a data cache in accordance with the above method.

At least one additional embodiment of the invention provides a data cache comprising a data store and control logic. The control logic comprises a cache controller for controlling storage and retrieval of data in the cache, a storage allocator for managing storage space in the data store, and a monitor module. The cache controller is adapted to implement an eviction policy for selecting data to be evicted from the cache. The storage allocator includes a garbage collection module for implementing a garbage collection process to maintain free storage blocks in the data store. The garbage collection module is selectively operable in a relocation mode and an eviction mode in response to a control input. In the relocation mode, data contained in a set of storage blocks selected for garbage collection is relocated in the data store. In the eviction mode, a set of storage blocks for garbage collection is selected in dependence on the eviction policy and data contained in each selected storage block is evicted from the cache. The monitor module is adapted to monitor performance of the cache in relation to a predefined performance target and to generate the control input in dependence thereon such that the garbage collection process is selectively performed in the relocation and eviction modes so as to promote compliance with the performance target.

Embodiments of the invention will be described in more detail below, by way of illustrative and non-limiting example, with reference to the accompanying drawings.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
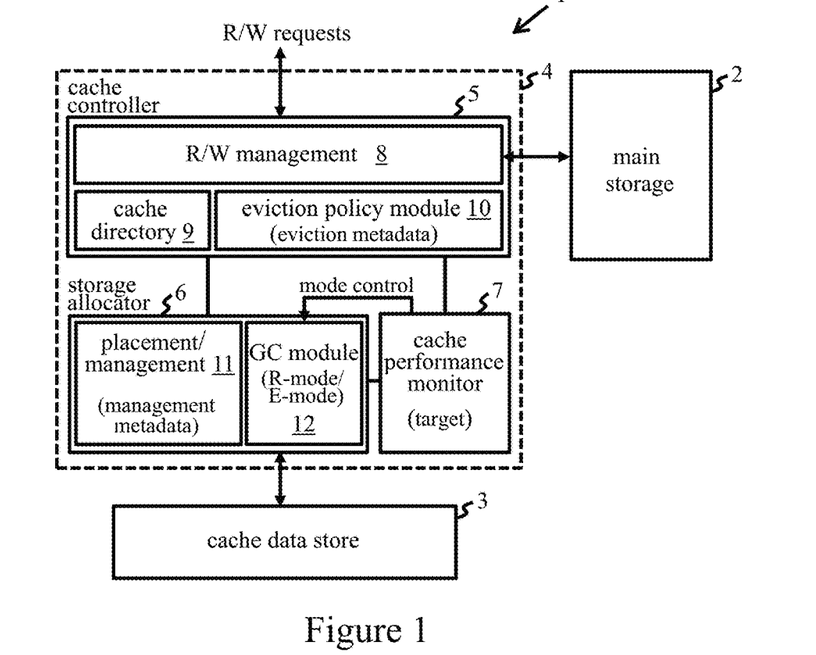
FIG. 1 is a schematic representation of storage apparatus employing a data cache embodying the invention.

FIG. 1 is a schematic block diagram of cache storage apparatus showing basic elements involved in operation of the cache and implementation of the performance control method detailed below. The apparatus comprises a data cache, indicated generally at 1, for caching data objects stored in main storage 2 of a data processing system. The cache 1 has a cache data store 3 and control logic 4 comprising a cache controller 5, a storage allocator 6 and a cache performance monitor module 7. Cache controller 5 controls operation of cache 1 generally, handling operations required for storage and retrieval of data in the cache. The cache controller 5 comprises a read/write (R/W) management module 8, a cache directory 9 and an eviction policy module 10. R/W management module 8 receives and services requests for reading and writing of data from a system host, and provides functionality for handling cache hit, cache miss and cache population procedures in generally known manner. The R/W management module maintains cache directory 9 which contains entries for data objects currently stored in cache data store 3. The cache directory contains object identifiers for respective data objects, and address data indicating addresses of those data objects in data store 3. A typical directory entry may comprise a unique object identifier, an address corresponding to a location in data store 3, and data indicating size/length of the object. Entries may also include additional metadata used in internal cache procedures, e.g. metadata indicative of data usage as discussed further below.

The eviction policy module 10 implements a predetermined eviction policy for the data cache 1. This policy is used to select data to be evicted from the cache, in circumstances defined in the policy, to ensure that sufficient cache storage is always available to service host requests. Cache eviction procedures can be implemented in numerous ways, e.g. based on LRU (least-recently-used), LRW (least-recently-written), LFU (least-frequently-used), etc., policies or a combination thereof. Module 10 maintains eviction metadata for data stored in the cache as required to implement the policy in question. For example, eviction metadata may indicate time or order of use or writing of data objects for LRU or LRW policies, or count read/write accesses for data objects for an LFU policy, etc., in accordance with the particular eviction policy employed. In general, such eviction metadata may be maintained in eviction module 10 and/or elsewhere in control logic 4, e.g. in cache directory 9, and may be maintained for data at various levels of granularity, e.g. for individual data objects and/or particular storage blocks in data store 3 as discussed further below. Cache performance control methods embodying the invention can be implemented with any type of eviction policy and associated eviction metadata in cache 1.

Storage allocator 6 manages storage space in cache data store 3 and is shown here comprising a data placement/space management module 11 and a garbage collection (GC) module 12. Module 11 controls allocation of physical address space in data store 3, and writes and reads data in this address space via an interface (not shown) with data store 3 in response to write/read instructions from cache controller 5. (As discussed further below, in some embodiments cache controller 5 can also access the cache data store directly in response to host requests in the case of a cache hit). Placement/management module 11 performs various management functions, such as monitoring storage capacity utilization and tracking validity of stored data, and maintains management metadata required for all management functions. In particular, module 11 typically monitors the free storage space (i.e. space which is available for allocation of new data) in data store 3, and maintains metadata indicating the amount and location of free storage. The management metadata also includes validity metadata which indicates whether particular storage space contains valid or invalid data. For example, storage space containing data which has been deleted by the host, or which has been updated by new data written elsewhere in data store 3, can be marked as invalid by associated validity metadata. Such management operations are well known in the art, and the implementation details are orthogonal to the performance control operation detailed below.

GC module 12 implements a garbage collection process to maintain free storage blocks in data store 3 so that space may be allocated for new data. Garbage collection may be implemented under control of management module 11, e.g. when the amount of free storage space drops below a threshold level. The GC module here is selectively operable in two modes: a relocation mode (R-mode) and an eviction mode (E-mode). In the relocation mode, data (in particular, valid data) contained in a set of storage blocks selected for garbage collection is relocated in the data store. In the eviction mode, a set of storage blocks for garbage collection is selected in dependence on the eviction policy implemented by eviction module 10, and data (in particular, valid data) contained in each selected storage block is evicted from the cache. Thus, in the relocation mode, valid data is relocated without being evicted from the cache, and, in the eviction mode, valid data is evicted without requiring relocation. The operating mode is selected in GC module 12 in response to a control input from monitor module 7. In particular, the monitor module 7 is adapted to monitor performance of the data cache in relation to a predefined performance target, and to generate the GC mode control input in dependence thereon. The operation of monitor module 7 and the resulting GC operation is described in more detail below.

Data cache 1 can be implemented in numerous system architectures, and main storage 2 may comprise various storage components such as RAM (random access memory), hard disks, optical disks, tape drives, etc., and may comprise multiple storage devices e.g. multiple HDDs in a RAID (redundant array of independent disks) system and/or different types of storage components in a tiered storage system. Depending on the particular system architecture, accesses to main storage 2 may be controlled directly from R/W module 8, or cache controller 5 may interface with a storage controller in main storage 2 which manages access to the underlying storage.

Cache data store 3 may comprise various storage media such as DRAM, NAND flash or other SSD (solid state device) memory, or non-volatile memory such as PCM, 3DXP, etc., and may be implemented in general by one or more storage elements, for example by an array of flash memory dies or other SSD units providing multiple storage channels in data store 3.

While an exemplary structure is shown in FIG. 1, the functionality of one or more modules 5 through 12 of data cache 1 may be wholly or partially combined, and control logic 4 may include additional functionality orthogonal to the performance control operation below. For example, storage allocator 6 may perform additional management operations such as wear-levelling, bad block management, and error-correction coding to protect against failures in cache storage elements. In some embodiments, management module 11 may also include an indirection layer defining an address mapping, such as an LBA to PBA (logical block address to physical block address) mapping table, which maps logical addresses in cache directory 9 to physical address space in data store.

Figure 2:
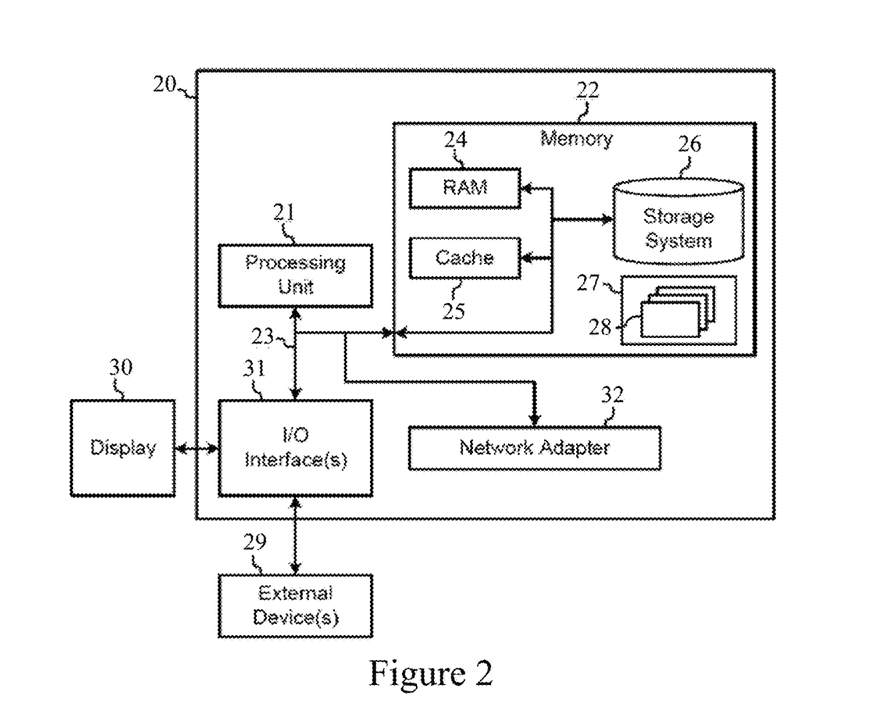
FIG. 2 is a generalized schematic of processing apparatus.

In general, functionality of modules 5 through 12 may be provided by logic implemented in hardware or software or a combination thereof. Such logic may be described in the general context of computer system-executable instructions, such as program modules, executed by a programming apparatus. Such apparatus may be implemented by general-purpose processing apparatus or special-purpose processing apparatus comprising one or more ASICs (Application-Specific Integrated Circuits), FPGA's (Field-Programmable Gate Arrays), microcontrollers, firmware, etc., of data cache 1. Generally, program modules may include routines, programs, objects, components, logic, data structures, and so on that perform particular tasks or implement particular abstract data types. The block diagram of FIG. 2 shows an exemplary computing apparatus for implementing control logic of data cache 1. The apparatus is shown here in the form of a general-purpose computing device 20. The components of computer 20 may include one or more processors represented by processing unit 21, a system memory 22, and a bus 23 that couples various system components including system memory 22 to processing unit 21.

Bus 23 represents one or more of any of several types of bus structures, including a memory bus or memory controller, a peripheral bus, an accelerated graphics port, and a processor or local bus, using any appropriate bus architecture. By way of example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 20 typically includes a variety of computer readable media. Such media may be any available media that is accessible by computer 20 including volatile and non-volatile media, and removable and non-removable media. For example, system memory 22 can include computer readable media in the form of volatile memory, such as random access memory (RAM) 24 and/or internal cache memory 25. Computer 20 may further include other removable/non-removable, volatile/non-volatile computer system storage media. By way of example only, storage system 26 can be provided for reading from and writing to other storage devices, e.g. a hard drive, floppy disk drive, optical disk drive, etc., each of which can be connected to bus 23 by one or more data media interfaces.

Memory 22 may include at least one program product having one or more program modules that are configured to carry out functions of embodiments of the invention. By way of example, program/utility 27, having a set of (one or more) program modules 28, may be stored in memory 22, as well as an operating system, one or more application programs, other program modules, and program data. Program modules 28 may implement the functions and/or methodologies of embodiments of the invention as described herein.

Computer 20 may also communicate with: one or more external devices 29 such as a keyboard, a pointing device, a display 30, etc., that enable a user to interact with computer 20; and/or any devices (e.g., network card, modem, etc.) that enable computer 20 to communicate with one or more other computing devices. Such communication can occur via Input/Output (I/O) interfaces 31. Also, computer 20 can communicate with one or more networks such as a local area network (LAN), a general wide area network (WAN), and/or a public network (e.g., the Internet) via network adapter 32 which communicates with the other components of computer 20 via bus 23. Other hardware and/or software components may be used in conjunction with computer 20, including microcode, device drivers, redundant processing units, and other external devices 29 including external storage devices such as SSDs, disk drive arrays, RAID systems, tape drives, and data archival storage systems, etc.

If cache control logic 4 is implemented by a general-purpose computer as described with reference to FIG. 2, the cache data store 3 and main storage 2 of the FIG. 1 system may be implemented, for example, as components of storage system 26 and/or as external devices 29 connected to computer 20.

Figure 3:
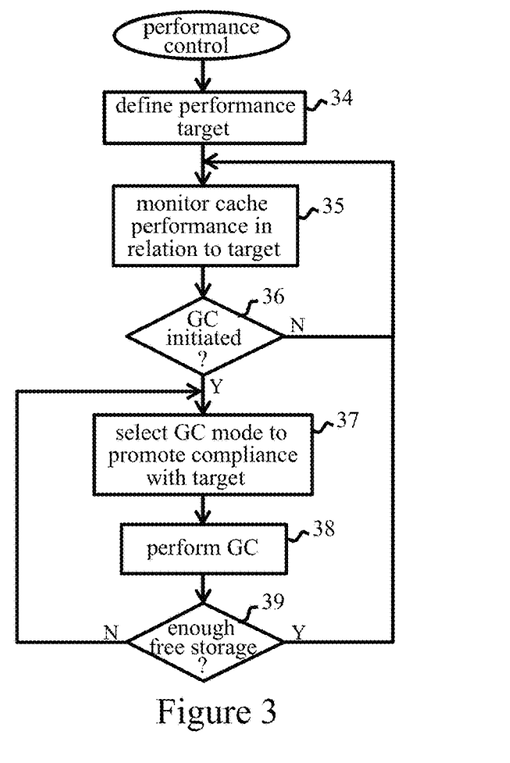
FIG. 3 indicates steps of a cache performance control method embodying the invention.

FIG. 3 indicates steps of a performance control method performed by data cache. A performance target is defined for cache operation as indicated at step 34. This performance target may be defined in terms of various operational parameters, and may predefined for the lifetime of the cache or for a particular operating period, as discussed further below. The performance target is stored in monitor module 7. During cache operation, monitor module 7 monitors performance of the cache in relation to the performance target as indicated at step 35. The monitoring procedure may involve monitoring of various operations performed by storage allocator 6 (and possibly also cache controller 5) for determining cache performance according to the particular nature of the performance target. The monitor module thus measures current cache performance and compares this with the performance target. The monitor module 7 then generates the mode control input for GC module 12 in dependence on the measured cache performance in relation to the target. On initiation of a garbage collection process ("Yes" at decision step 36), operation proceeds to step 37 in which the GC module 12 selects either the relocation mode or the eviction mode for that GC process in dependence on the current mode control input from monitor module 7. In step 38, the GC module 12 then implements the GC process in the selected mode. In decision step 39, the GC module determines whether sufficient free storage is now available in data store 3. This can be determined based on the metadata maintained by management module 11, e.g. if the number of free storage blocks has reached a threshold level. If not, a further run of the garbage collection process is initiated and operation returns to step 37 for this process. When sufficient free storage has been recovered at decision step 39, garbage collection terminates and operation returns to step 35 for continued monitoring of cache performance. The monitoring process of step 35 continues during garbage collection in steps 36 to 39, whereby the GC mode can be selected for each run of the GC process based on the current state of the mode control signal on initiation of that process. The performance target may also be dynamically updated at any point during the GC operation, e.g. in response to a control input, as discussed further below.

When a relocation mode GC process is implemented in step 39, data contained in a set of storage blocks selected for garbage collection is relocated in data store 3, as for a conventional garbage collection process. In this mode, the set of (one or more) storage blocks can be selected by GC module 12 on any desired basis. For example, the most appropriate storage blocks can be selected based on the management metadata maintained by module 11, e.g. as those blocks containing the most invalid data, or as those blocks that were least-recently written (in a Circular Buffer structure), etc. A storage block may contain both valid and invalid data, and only valid data need be relocated in the GC process. The valid data is thus written to free storage locations in data store 3, and the corresponding address data is updated in the cache. If storage allocator 11 employs an indirection layer to map logical addresses in directory 9 to physical addresses in data store 3, then physical addresses in this mapping are updated in storage allocator 6 for the relocated data. As described below, however, in preferred embodiments such an indirection layer is not required and address updates are performed directly in cache directory 9.

When an eviction mode GC process is implemented in step 39, a set of (one or more) storage blocks for garbage collection is selected in dependence on the eviction policy implemented by eviction module 10. GC module 12 thus accesses the eviction metadata maintained by eviction module 10 to identify the appropriate storage block(s) for the GC process in this mode. Details of this operation will depend on the granularity for which eviction metadata is maintained by module 10. For example, in embodiments where eviction metadata is maintained for particular data objects (e.g. user data files or other data objects defined by higher layers in the host system), then the GC module identifies the next data object(s) to be evicted in accordance with the eviction policy (e.g., the least-recently used or least-recently written data object(s) for an LRU or LRW policy, or the data object(s) with the lowest hit count for a LFU policy, and so on) based on the associated eviction metadata. The GC module then selects storage block(s) which contain the data object(s) thus identified for the garbage collection process. In other embodiments, eviction metadata could be maintained at the storage block level as discussed further below. In general, however, storage blocks may be selected for the GC process as appropriate based on the particular eviction policy and granularity of the associated eviction metadata. Data contained in each selected storage block is then evicted from the cache. The GC module thus deletes the entry in cache directory 9 for each data object corresponding to the evicted data, i.e. the valid data in the selected storage block(s).

Each time the GC process is performed, the relocation or eviction mode process is selected based on the current mode control input from monitor module 7. This control input is generated by the monitor module, based on monitored cache performance relative to the performance target, such that the GC process is selectively performed in the relocation and eviction modes so as to promote compliance with the performance target. Selection of the relocation mode preserves valid data in the cache, but increases the number of read/write accesses to data store 3 due to relocation of the valid data. In particular, the number of read/writes in data store 3 is increased relative to number of cache read/writes in response to host R/W requests received by cache controller 5. This read/write differential leads to so-called I/O (input/output) amplification in the cache, reducing the cache I/O rate, e.g. inputs/outputs per second (IOps), available to the host. Use of the relocation mode GC process thus reduces cache I/O rate in favor of potentially higher cache hit ratio (i.e. the percentage of cache hits in response to host requests). In contrast, evicting data from the cache in the GC eviction mode potentially reduces cache hit ratio in favor of lower I/O amplification and higher cache I/O rate. Selectively switching between the two GC modes thus allows I/O rate and cache hit ratio to be controlled in order to promote compliance with a desired cache performance target.

In general, the cache performance target may be defined in terms of one or more performance metrics, and selective switching between GC modes may be controlled in various ways to steer cache performance towards the target. For example, a performance target may be defined in terms cache I/O rate, cache hit ratio, I/O amplification, or write amplification (WA) as described below, and may be specified in terms of limits or other target values for one or a combination of such parameters. Selection between GC modes may be performed based on comparison of measured and target values for one or more such parameters. GC mode selection may be performed to ensure that a limit for one parameter is not exceeded while otherwise optimizing cache operation. For example, the performance target may be dependent on one of a desired minimum cache I/O rate and a desired minimum cache hit ratio. The monitor module may then generate the mode control input such that, on initiation of the GC process, GC module 12 selects one mode if the performance target is not met and selects the other mode if the performance target is met. This trades off cache hit ratio and I/O rate while providing a minimum limit on one. GC mode selection can be dynamically controlled to trade off cache I/O rate and cache hit ratio in any manner required to achieve a desired performance target.

Figure 4:
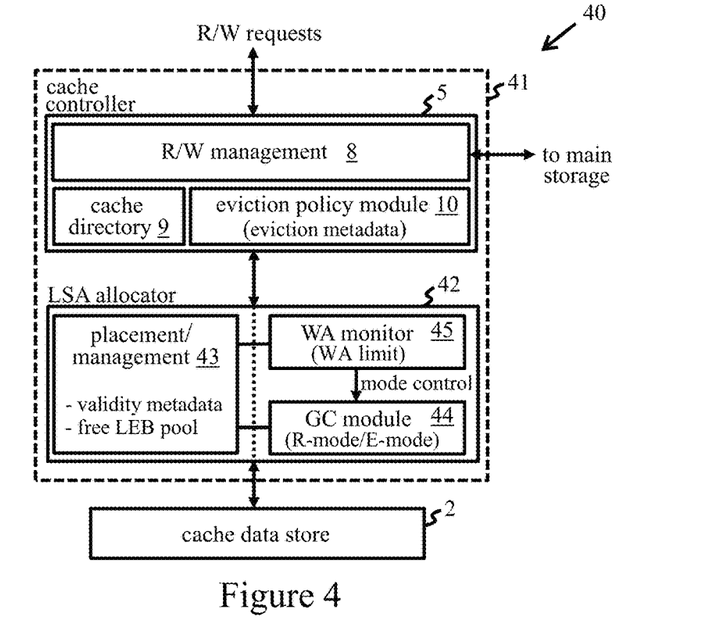
FIG. 4 is a schematic representation of a preferred embodiment of a data cache.

A preferred embodiment of data cache 1 is described in more detail below with reference to FIGS. 4 to 8. FIG. 4 is a schematic block diagram of the data cache 40. Components corresponding to those of FIG. 1 are indicated by like references, and only key differences are described in the following. The cache control logic 41 of this embodiment includes a log-structured storage allocator (LSA allocator) 42. The LSA allocator includes a data placement/space management module 43 which manages storage space in data store 2, maintaining the required metadata, generally as before. This embodiment uses a collapsed directory structure as discussed below. As indicated in the figure, cache controller 5 can access the data store 2 directly using cache directory 9 in response to host requests resulting in a cache hit. LSA allocator 42 also comprises a GC module 44 and a write amplification (WA) monitor module 45. The performance target is defined in WA module 45 as a WA limit.

LSA allocator 42 manages storage in cache data store 2 in generally known manner as a log-structured array, whereby data is written sequentially to free storage locations in the array. The garbage collection process performed by GC module 44 of the LSA allocator operates with storage blocks known as Logical Erase Blocks (LEBs) which are fixed-size consecutive ranges of storage space, e.g., 1 Gigabyte blocks. Management module 43 maintains metadata defining a free LEB pool in data store 2, indicating the number and location of LEBs available for allocation. The GC process operates generally as described above to reclaim LEBs for future allocation. The GC module thus operates in relocation and eviction modes, with the GC mode being selected dynamically in dependence on a mode control input from WA monitor 45. The amount of data relocated in the GC relocation mode constitutes the GC clean-up overhead: a write and read amplification which constitute the total I/O amplification factor. To accommodate garbage collection, the total number of LEBs has to be greater than the number of LEBs exposed to the user (host). The number of spare LEBs essential for garbage collection is often referred to as "over-provisioning space" in LSA terminology. The GC efficiency is measured by the amount of I/O amplification it requires in order to provide free (or "clean") LEBs to the LSA allocator. This I/O amplification comprises a read and a write component:

$$\text{Write Amplification} = \frac{(\text{Data Written To Store})}{(\text{Data Written By User})} \quad (1)$$

$$\text{Data Written To Store} = (\text{Data Written By User}) + (\text{Data Relocated}) \quad (2)$$

$$\text{Read Amplification} = \frac{(\text{Data Read From Store})}{(\text{Data Read By User})} \quad (3)$$

$$\text{Data Read From Store} = (\text{Data Read By User} + \text{Data Relocated}) \quad (4)$$

$$\text{I/O Amplification} = \frac{(\text{Data Read From Store}) + (\text{Data Written To Store})}{(\text{Data Read By User}) + (\text{Data Written By User})} \quad (5)$$

Figure 5:
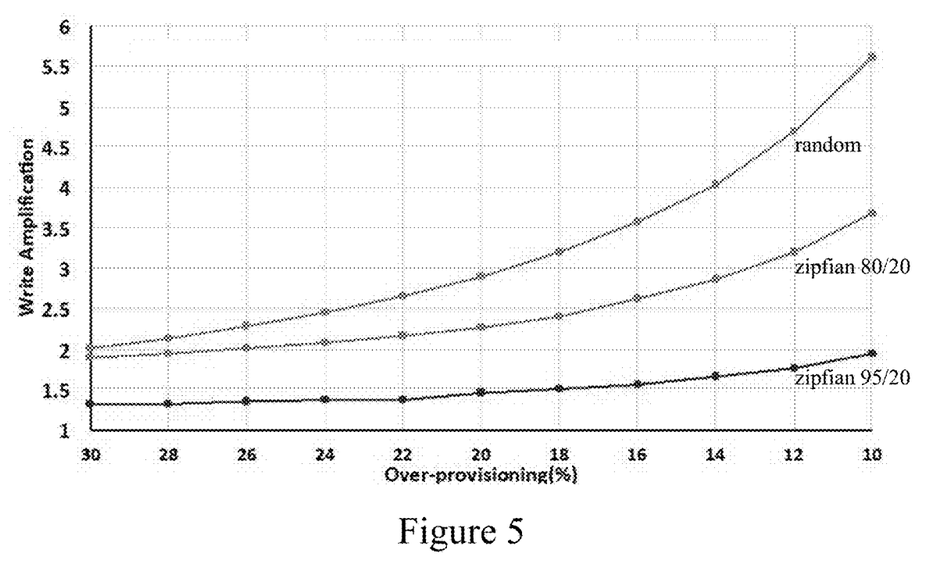
FIG. 5 indicates relationship between write amplification and overprovisioning space for different workload types in a cache.
Figure 6:
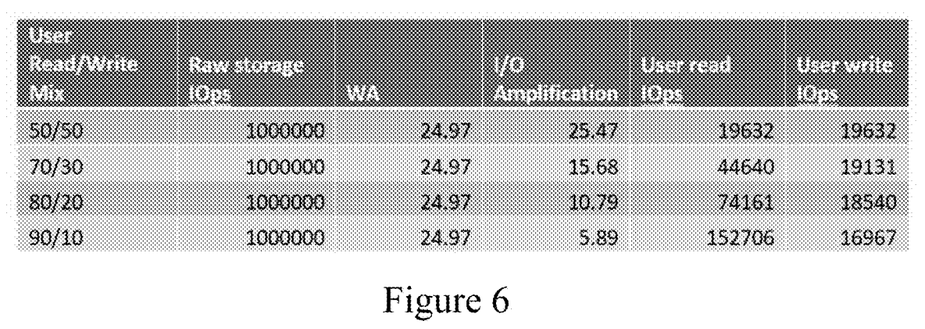
FIGS. 6 and 7 tabulate cache operating parameters for various read/write workload mixes.

The amount of relocated data is directly related to the number of user writes. Both the write and read amplification are defined by the relocated data. Further, the write amplification itself is correlated with the amount of overprovisioning space available. The relation between write amplification and overprovisioning space for three artificial workloads is depicted in FIG. 5. Write amplification is plotted against overprovisioning for a uniform random workload (where user writes are uniformly distributed randomly over the address space), and two skewed workloads (where "zipfian x/y" indicates a Zipfian workload in which x % of user writes target y % of the address space). If the write amplification is known (e.g., when the overprovisioning is known and the write workload type is given), then the I/O amplification can be computed as follows:

$$\text{I/O Amplification}=(\text{Write Amplification}*2*\text{Write Ratio})+\text{Read Ratio} \quad (6)$$

where: * denotes multiplication and the write ratio and read ratio denote the ratio of user writes and reads respectively to overall user access requests. The multiplication factor of 2 in Equation (6) comes from the fact that each relocation operation requires 1 read and 1 write, i.e. 2 I/O operations. The effect of Equation (6) is demonstrated in the table of FIG. 6. This illustrates performance impact of the GC cleanup to user performance (read and write IOps (inputs/outputs per second)) for specific read/write workload mixes (i.e. read/write ratio) and a storage medium with raw performance of $10^6$ IOps with a workload comprising uniform random writes and an overprovisioning of 2%.

Figure 7:
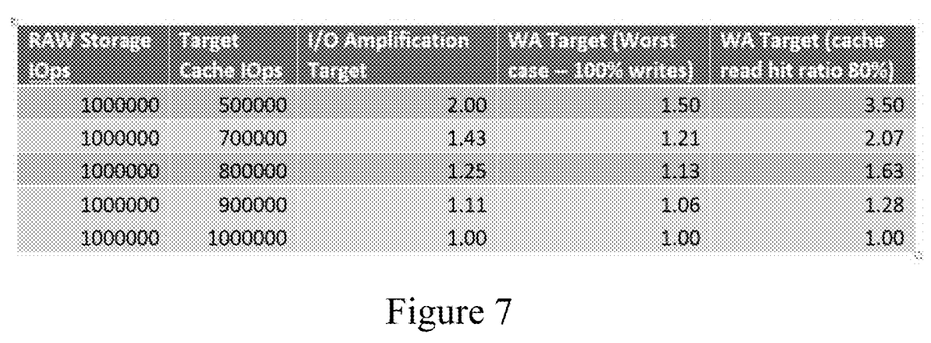

The performance control method in data cache 40 aims to guarantee a chosen cache performance target lower bound, in terms of IOps, for a given storage medium raw performance by trading off cache hit ratio. Examples of cache performance target lower bounds in IOps, and the equivalent WA target to achieve that IOps goal in each case, are shown in the table of FIG. 7 for two cache read/write workload mixes (100% writes and 80% reads/20% writes). It can be seen that, to guarantee a target cache lower bound IOps performance it is sufficient to guarantee an upper bound in the WA of the system. This WA limit L is defined as the performance target in WA monitor 45 of data cache 40. In operation of the cache, WA monitor 45 monitors a current level of write amplification by tracking write operations by LSA allocator 6 and write requests from cache controller 5. The WA module generates the control input to GC module 44 by comparing the current WA level with the WA limit L such that, on initiation of a GC process, the GC module selects the relocation mode for that process if the current WA level is below the limit, and otherwise selects the eviction mode for that GC process.

Figure 8:
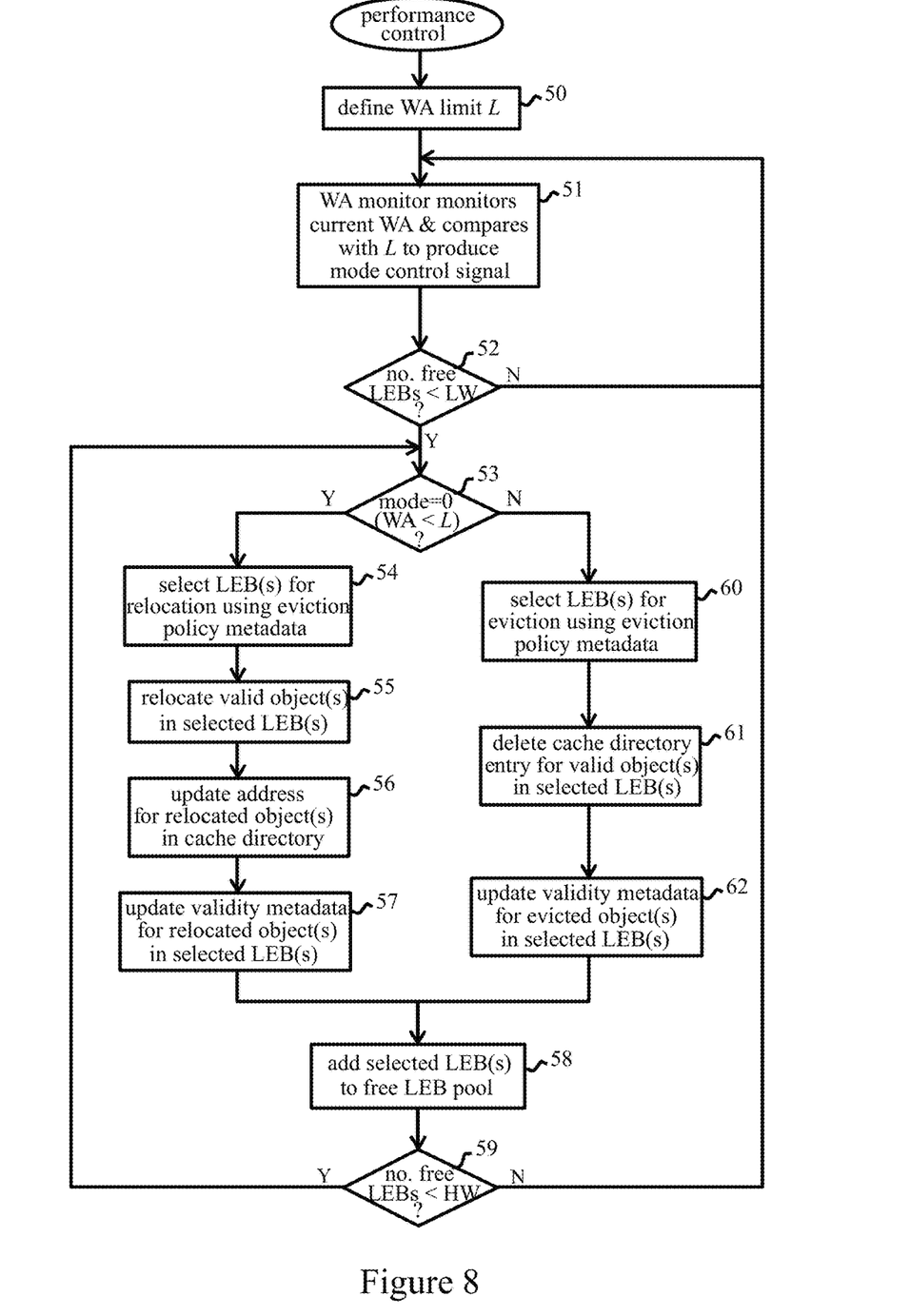
FIG. 8 indicates steps of a preferred cache performance control method embodying the invention.

FIG. 8 shows the performance control method of this embodiment. The WA limit L is defined in dependence on the target IOps in step 50 of FIG. 8. This limit may be predefined for the lifetime of the cache, or may be updated dynamically as described further below. During cache operation, WA monitor 45 monitors the current WA level as indicated at step 51. The current WA may be determined here over the cache lifetime or over a particular operating period, e.g., WA in the last second, minute, etc., or, if the target is updated dynamically, since the last WA limit update. WA monitor 45 compares the current WA level to the WA limit L, and sets the mode control input to a first value, here 0, if current WA<L, and to a second value, here 1, if current WA≥L. Garbage collection is controlled based on two thresholds applied to the number of free LEBs in the free LEB pool of LSA allocator 42: a low watermark LW and a high watermark HW (HW>LW). When the number of free LEBs drops below LW, as indicated by decision Yes at decision block 52, a GC process is initiated in GC module 44. The GC module then selects the GC mode based on the control input from monitor module 45. If the control input=0, i.e. WA<L, in decision step 53, the GC module selects the relocation mode and operation proceeds to step 54. Here, one or more LEBs for the relocation mode GC process is selected in dependence on the eviction policy in eviction module 10. GC module 44 thus accesses the eviction metadata to identify the appropriate LEB(s) for the GC operation. The selection process here is generally as described for the eviction mode operation of FIG. 3, except that the selected LEBs are those containing the data indicated as least-preferable for eviction by the policy. For example, LEB(s) containing the most-recently used or most-recently written data can be selected for an LRU or LRW policy. Similarly, LEB(s) containing the data with the highest hit count can be selected for an LFU policy, and so on. In step 55, valid data contained in the selected LEB(s) is then relocated in the cache. The data relocated here may comprise one or more data objects as detailed further below. In step 56, GC module 44 updates the address data for each data object corresponding to the relocated data. The address update here is performed directly in cache directory 9, providing a collapsed directory structure whereby no indirection layer is required in LSA allocator 42. In step 57, the validity metadata for the selected LEB(s) is updated to indicate the relocated data object(s) therein as invalid. The selected LEB(s) then contain no valid data and can be added to the free LEB pool in step 58. (In some embodiments, additional steps may be performed here before adding LEBs to the free LEB pool. For example, where the LSA allocator directly manages NAND flash blocks in a data store 2, flash blocks in the selected LEBs may be erased prior to adding LEBs to the free LEB pool.)

In step 59, GC module determines whether the number of free LEBs is still less than the high watermark HW. If so, a new GC process is initiated and operation reverts to step 53. If it is determined at step 53, on initiation of any run of a GC process, that the current WA≥L, then GC module 44 selects the eviction mode for that GC process. Operation then proceeds to step 60. Here, one or more LEBs for the eviction mode GC process is selected based on the eviction policy as described with reference to FIG. 3. One or more valid data objects in the selected LEB(s) is then evicted from the cache. In particular, in step 61, the cache directory entry for each data object is deleted from cache directory 9. The validity metadata for the selected LEB(s) is then updated in step 62 to indicate the evicted data object(s) as invalid. The selected LEB(s), now containing no valid data, are then added to the free LEB pool in step 58.

The above operation thus continues, with GC processes being performed until the number of free LEBs reaches the high watermark HW in step 59. As before, the monitoring process of step 51 continues during garbage collection, and may be dynamically redefined in step 50 at any time, whereby each GC process in steps 53 to 58 is performed based on the current state of the mode control signal from monitor module 45. When the number of free LEBs reaches the high watermark HW in step 59, garbage collection terminates and operation reverts to step 51 until further garbage collection is required.

The following algorithm describes an implementation of the above GC operation for variably-sized data objects.

Loop:
1. If number of free LEBs is above low watermark LW:
   a. go to next iteration
2. While number of free LEBs is below high watermark HW do:
   a. If current WA is lower than WA Target L:
      i. Choose candidate LEB(s) for relocation based on cache eviction policy
         1. If candidate LEB holds one or more objects:
            a. For each valid object in candidate LEB
               i. Relocate to a new address in another LEB
               ii. Update the cache directory entry for object with new address
         2. Else (LEB holds object that spans multiple LEBs)
            a. Retrieve other LEB(s) that hold the object
               i. Relocate object to a new address in other LEB(s)
               ii. Update the cache directory entry for object with new address
      ii. Candidate LEB(s) no longer holds data, place in the list of free LEBs
   b. Else (current WA is greater or equal to WA Target L):
      i. Choose candidate LEB(s) for relocation based on cache eviction policy
         1. If candidate LEB holds one or more objects:
            a. For each valid object in candidate LEB
               i. Delete cache directory entry for object
               ii. Invalidate object in LEB
         2. Else (LEB holds object that spans multiple LEBs)
            a. Retrieve other LEB(s) that hold the object
               i. Delete cache directory entry for object
               ii. Invalidate LEBs
      ii. Candidate LEB(s) no longer holds data, place in the list of free LEBs.

In general, eviction metadata may be maintained at one or more different granularity levels in data cache 40. In particular, eviction metadata may be maintained at the LEB level for convenience in the integrated GC/eviction policy implementation above. R/W accesses to cached data objects are then used to update eviction metadata for the LEBs containing those data objects as appropriate to the particular eviction policy (e.g. LRU, LFU, etc.,). LEBs can then be directly selected for garbage collection based on the LEB-level eviction data. Any cache eviction policy can be implemented at the granularity of the GC process. The policy then simply operates at a different granularity than cached data objects, namely LEBs. Examples of cache hit, miss and population handler functionality in R/W management module 8 in such an embodiment are expressed in the following algorithms.

Object cache hit handler (requested data found in the cache directory):
1. Retrieve address for data object
2. Based on address, identify LEB(s) which contain object
3. Update LEB(s) eviction metadata based on policy (e.g., for LRU make LEB(s) the most recently used, etc.)
4. Read the data object and service the request Object cache miss handler (requested data not found in the cache directory):
1. Perform cache population if the caching policy dictates so (e.g., for LRU the data will be immediately populated)
2. Update LEB(s) metadata based on eviction policy Object cache population handler:
1. Read data object from main data storage
2. Allocate cache storage capacity to hold the object
3. Insert entry in cache directory with unique identifier for the object and address data for storage location allocated in step 2.

It will be seen that data cache 40 allows a lower bound target cache IOps to be met by controlling the WA level, and hence IO amplification, while maintaining the minimum cache evictions required to achieve that performance target. Garbage collection is integrated with cache eviction, and the eviction policy is used to select LEBs for garbage collection in both GC modes. Moreover, a collapsed directory structure is employed, with address updates required on garbage collection being performed directly in cache directory 9. No additional indirection layer is needed in LSA allocator 42. This provides a highly-efficient system for controlling cache operation with a target cache I/O rate.

Various changes and modifications can of course be made to the exemplary embodiments described. For example, other performance targets may be defined for cache operation. A target (e.g. minimum) cache hit ratio may be specified, for instance. Here, the GC eviction mode may be selected if the target is currently met, and the relocation mode selected if not. Targets may be otherwise defined in terms of one or a combination of various parameters such as I/O rate, I/O bandwidth, I/O amplification, write amplification, cache hit ratio, etc., and GC mode selection may be performed as a more complex function of one or more such parameters. Embodiments might be envisaged for example, in which target ranges are specified for more than one operating parameter, with priority being given to adjusting current values of each parameter according to positions of current values within the target ranges. A performance target may also be updated dynamically in operation response to at least one operational parameter for the cache. For example, monitor module 45 may be adapted to update the WA target in response to changes in operational parameters such as read/write ratios, workload type, etc., or changes in cache hit ratio due to such altered parameters. A given target may be updated periodically to adjust for variations in operational parameters and/or in response to an input indicating an altered parameter.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling performance of a data cache which implements a garbage collection process for maintaining free storage blocks in a data store of the cache and an eviction policy for selecting data to be evicted from the cache, the method comprising:
   defining a performance target for operation of the cache;
   in operation of the cache, monitoring performance of the cache in relation to said performance target; and
   selectively performing said garbage collection process in one of a relocation mode and an eviction mode so as to promote compliance with said performance target;

wherein, in said relocation mode, data contained in a set of storage blocks selected for garbage collection is relocated in said data store and, in said eviction mode, a set of storage blocks for garbage collection is selected in dependence on said eviction policy and data contained in each selected storage block is evicted from the cache, wherein said performance target comprises a write amplification limit, the method including:

monitoring a current level of write amplification in operation of the cache;

comparing said current level with said write amplification limit; and on initiation of said garbage collection process, selecting the relocation mode for that garbage collection process if the current level is below the limit and otherwise selecting the eviction mode for that garbage collection process.

2. The method as claimed in claim 1 wherein said performance target is dependent on one of a desired minimum cache input/output rate and a desired minimum cache hit ratio, the method including, on initiation of said garbage collection process:

selecting a first mode of said relocation and eviction modes for that garbage collection process if the performance target is not met; and selecting a second mode of said relocation and eviction modes for that garbage collection process if the performance target is met, the first and second modes being different from one another.

3. The method as claimed in claim 1 including defining said performance target dynamically in dependence on at least one operational parameter for the cache.

4. The method as claimed in claim 1 including, in said relocation mode, selecting said set of storage blocks for garbage collection in dependence on said eviction policy.

5. The method as claimed in claim 1 wherein said performance target is dependent on one of a desired minimum cache input/output rate and a desired minimum cache hit ratio, the method including, on initiation of said garbage collection process:

selecting a first mode of said relocation and eviction modes for that garbage collection process if the performance target is not met; and selecting a second mode of said relocation and eviction modes for that garbage collection process if the performance target is met, the first and second modes being different from one another;

wherein said performance target is dependent on a desired minimum cache input/output rate, the method including, on initiation of said garbage collection process:

selecting the eviction mode for that garbage collection process if the performance target is not met; and selecting the relocation mode for that garbage collection process if the performance target is met.

6. The method as claimed in claim 1 including defining said write amplification limit dynamically in dependence on at least one operational parameter for the cache.

7. The method as claimed in claim 1 including, in said relocation mode, selecting said set of storage blocks for garbage collection in dependence on said eviction policy.

8. The method as claimed in claim 1 wherein the data cache maintains a cache directory containing entries for respective data objects stored in said data store, said entries comprising object identifiers for respective data objects and address data indicating addresses of those data objects in the data store, and wherein:

in said eviction mode, the garbage collection process includes, for said data evicted from the cache, deleting from the cache directory said entry for each data object corresponding to the evicted data; and in said relocation mode, the garbage collection process includes, for said data relocated in the data store, updating the address data of said entry in the cache directory for each data object corresponding to the relocated data.

9. A data cache comprising a data store and control logic comprising:

a cache controller for controlling storage and retrieval of data in the cache, the cache controller being adapted to implement an eviction policy for selecting data to be evicted from the cache;

a storage allocator for managing storage space in said data store, the storage allocator including a garbage collection module for implementing a garbage collection process to maintain free storage blocks in the data store, wherein the garbage collection module is selectively operable, in response to a control input, in a relocation mode in which data contained in a set of storage blocks selected for garbage collection is relocated in the data store, and in an eviction mode in which a set of storage blocks for garbage collection is selected in dependence on said eviction policy and data contained in each selected storage block is evicted from the cache; and a monitor module adapted to monitor performance of the cache in relation to a predefined performance target and to generate said control input in dependence thereon such that said garbage collection process is selectively performed in said relocation and eviction modes so as to promote compliance with said performance target, wherein said performance target comprises a write amplification limit, and wherein:

the monitor module is adapted to monitor a current level of write amplification in operation of the cache, and to generate said control input by comparing said current level with said write amplification limit such that, on initiation of said garbage collection process, the garbage collection module selects the relocation mode for that garbage collection process if the current level is below the limit and otherwise selects the eviction mode for that garbage collection process.

10. The data cache as claimed in claim 9 wherein said performance target is dependent on one of a desired minimum cache input/output rate and a desired minimum cache hit ratio, and wherein the monitor module is adapted to generate said control input such that, on initiation of said garbage collection process:

the garbage collection module selects a first mode of said relocation and eviction modes for that garbage collection process if the performance target is not met; and the garbage collection module selects the other a second mode of said relocation and eviction modes for that garbage collection process if the performance target is met, the first and second modes being different from one another.

11. The data cache as claimed in claim 10 wherein the storage allocator comprises a log-structured storage allocator.

12. The data cache as claimed in claim 10 wherein said performance target is dependent on a desired minimum cache input/output rate, and wherein the monitor module is adapted to generate said control input such that, on initiation of said garbage collection process:

the garbage collection module selects the eviction mode for that garbage collection process if the performance target is not met; and the garbage collection module selects the relocation mode for that garbage collection process if the performance target is met.

13. The data cache as claimed in claim 9 wherein the monitoring module is further adapted to define said write amplification limit dynamically in dependence on at least one operational parameter for the cache.

14. The data cache as claimed in claim 9 wherein the garbage collection module is adapted, in said relocation mode, to select said set of storage blocks for garbage collection in dependence on said eviction policy.

15. The data cache as claimed in claim 9 wherein:

the cache controller is adapted to maintain a cache directory containing entries for respective data objects stored in said data store, said entries comprising object identifiers for respective data objects and address data indicating addresses of those data objects in the data store; and the storage allocator is adapted, for said data evicted from the cache in the eviction mode, to delete from the cache directory said entry for each data object corresponding to the evicted data, and, for said data relocated in the data store in the relocation mode, to update the address data of said entry in the cache directory for each data object corresponding to the relocated data.

16. A computer program product for controlling performance of a data cache, the computer program product comprising a computer readable storage medium having program instructions embodied therein, the program instructions being executable by processing apparatus implementing the data cache using a data store to cause the processing apparatus to:

implement a garbage collection process for maintaining free storage blocks in the data store, and an eviction policy for selecting data to be evicted from the cache;

define a performance target for operation of the cache;

in operation of the cache, monitor performance of the cache in relation to said performance target; and selectively perform said garbage collection process in one of a relocation mode and an eviction mode so as to promote compliance with said performance target;

wherein, in said relocation mode, data contained in a set of storage blocks selected for garbage collection is relocated in said data store and, in said eviction mode, a set of storage blocks for garbage collection is selected in dependence on said eviction policy and data contained in each selected storage block is evicted from the cache, wherein said performance target comprises a write amplification limit, the program instructions being further executable by the processing apparatus to cause the processing apparatus to:

monitor a current level of write amplification in operation of the cache;

compare said current level with said write amplification limit; and on initiation of said garbage collection process, select the relocation mode for that garbage collection process if the current level is below the limit and otherwise select the eviction mode for that garbage collection process.

17. The computer program product as claimed in claim 16 wherein said performance target is dependent on a desired minimum cache input/output rate, the program instructions being further executable by the processing apparatus to cause the processing apparatus, on initiation of said garbage collection process, to:

select the eviction mode for that garbage collection process if the performance target is not met; and select the relocation mode for that garbage collection process if the performance target is met.

\* \* \* \* \*